United States Patent [19]

Supcoe et al.

[11] Patent Number: 4,631,303

[45] Date of Patent: Dec. 23, 1986

[54] UNDERWATER FORMULATION AND METHOD FOR CLEANING AND WAXING SIMULTANEOUSLY

[75] Inventors: Robert F. Supcoe; Harold H. Singerman; Jack E. Whitacre, all of Annapolis, Md.

[73] Assignee: The United States of America as represented by the Secretary of the Navy, Washington, D.C.

[21] Appl. No.: 749,893

[22] Filed: Jun. 28, 1985

[51] Int. Cl.$^4$ .............................................. C09K 3/12
[52] U.S. Cl. ................................... 523/177; 524/466; 524/479; 524/490; 106/18.29
[58] Field of Search ............... 523/177; 524/466, 479, 524/490; 106/18.29

[56] References Cited

U.S. PATENT DOCUMENTS

| | | | |
|---|---|---|---|
| 2,988,528 | 6/1961 | Tench et al. ......................... | 524/479 |
| 3,014,003 | 12/1961 | Arabian .............................. | 524/479 |
| 3,036,024 | 5/1962 | Post et al. ........................... | 524/479 |
| 4,183,757 | 1/1980 | Groszek et al. ..................... | 106/18.29 |
| 4,185,094 | 1/1980 | Crump ................................ | 106/18.29 |
| 4,293,339 | 10/1981 | Supcoe et al. . | |
| 4,354,873 | 10/1982 | Supcoe et al. . | |
| 4,410,363 | 10/1983 | Supcoe et al. ..................... | 106/18.29 |
| 4,508,568 | 4/1985 | Fox .................................... | 106/18.29 |

FOREIGN PATENT DOCUMENTS

| | | | |
|---|---|---|---|
| 641357 | 5/1962 | Canada ............................... | 524/479 |
| 2516287 | 11/1976 | Fed. Rep. of Germany ... | 106/18.29 |
| 2221 | 1/1863 | Ireland .............................. | 106/18.29 |
| 964551 | 7/1964 | United Kingdom ................ | 524/466 |

OTHER PUBLICATIONS

Hackh's Chemical Dictionary—p. 534.
Textbook of Polymer Science—Fred W. Billmeyer, Jr., pp. 208-229—ch. 7.

*Primary Examiner*—Joseph L. Schofer
*Assistant Examiner*—N. Sarofim
*Attorney, Agent, or Firm*—L. A. Marsh

[57] ABSTRACT

A wax coating composition capable of underwater application to submerged surfaces consisting of a mixture of from about 3.5% to about 6.0% of a polyethylene homopolymer having a softening point at 85° C. (ASTM E28), a hardness of 90 (ASTM D5), a density of 0.88 g/cc (ASTM D1505), a viscosity of 40 cps at 140° C. (Brookfield), and an acid number of mil mg./kOH gram; of about 27% to about 31% of a mixture of Chlorowaxes selected from the group consisting of Chlorowax 70L, Chlorowax 40, Chlorowax 500, Chlorowax 100, and Indramic 30 Laminating wax; of about 3.5% to about 6.0% USP white mineral oil; of about 18.0% to about 20.0% Nopcocide N96; of about 40.5% to about 42.5% USP petrolatum; and of about 0.6% to about 1.05% Autofast Black 104 in xylene.

An application method utilizing the composition.

7 Claims, No Drawings

UNDERWATER FORMULATION AND METHOD FOR CLEANING AND WAXING SIMULTANEOUSLY

The invention describes herein may be manufactured and used by or for the Government of the United States of America for government purposes without the payment of any royalties thereon or therefor.

BACKGROUND OF THE INVENTION

This invention relates generally to coating materials for submerged surfaces of ships and more particularly to an improved cleaning, wax formulation, and an apparatus and method suitable for application to the submerged surfaces of ships.

The application of antifoulant and anticorrosive compounds to water-immersed surfaces is generally performed in drydock. Various biocidal materials have been used, each giving desired performance characteristics based on time and concentration expectations. Unfortunately, universal acceptance has not been the case, due to, costs, toxicity, durability, availability, wear, pollution regulatory requirements, and application problems. Prior wax-based formulations are illustrated by U.S. Pat. Nos. 2,838,419; 3,806,352; 3,959,530; 4,020,200; 4,098,925; 4,115,130; 4,154,818; 4,293,339; and 4,354,873.

The latter two U.S. patents illustrate underwater wax formulation and method though quite different from applicants' invention while the prior art discloses various compositions using waxes or linear polymers, in combination with various biocides to prevent marine growth, none disclose or suggest a combination which is capable of protecting sub-merged surfaces from fouling and corrosion, through use of a one-step cleaning and application method. Thus the continuing need for developing new underwater application formulations, apparatus, and methods for cost effective metal protective systems. The present invention constitutes a major step toward this end.

SUMMARY OF THE INVENTION

The present invention develops and optimizes a cleaning antifouling wax formulation that satisfies underwater, total immersion characteristics that meet application requirements for diver use. The wax formulations of the present invention also satisfies expected performance requirements for antifouling and corrosion resistance. The wax formulations of the invention has a paste like consistency and is easily applicable to a steel structure underwater at most temperatures under normal temperature conditions.

The antifouling formulation displaces water molecules from the a ship's surface, yet remains insoluble to seawater yet pliable during application. Preferably it is applied with a especially good quality type steel wool applicator, which cleans as well as coats the formulation upon application.

The antifouling formulation of this invention readily accepts specific types of antifoulants and biocides without adversely reacting therewith.

The above mentioned criteria are met by providing an antifouling formulation comprising, by weight percent, from about 3.8 to about 5.8% polyethylene homopolymer; from about 27.8% to about 29.8% of a mixture of waxes selected from the group consisting of: Chlorowax 70L, Chlorowax 40, Chlorowax 500, Chlorowax 100, and Indra Mic 30; from about 3.8 to about 5.8% white mineral oil; from about 18 to about 20% Nopcocide N96; from about 40.5–42.5% Petrolatum USP, white; and from about 0.5 to about 1.5 Autofast Black 104 in Xylene.

OBJECTS OF THE INVENTION

One object of the present invention is to provide an antifouling formulation for being applied as a coating to an underwater surface.

Another object of the invention is to provide an antifouling formulation containing a biocidal composition for being applied as a coating to an underwater surface.

Another object of the invention is to provide an antifouling formulation containing a biocidal composition and being applied with an especially good quality type steel wool applicator and as a cleaner and a coating for coating ship bottoms which, as applied, cleans the underwater surface as it coats the underwater surface.

Another object of the invention is to provide an antifouling formulation for coating ship bottoms which has ease of spreadability and easy application over a variety of regular and irregular structures and conditions.

And, a further object of the present invention is to provide a durable protective coating on a ship's bottom for preventing than as specifically described.

DESCRIPTION OF THE PREFERRED EMBODIMENT

The AC 1702 polyethylene homopolymer (manufactured by Allied Corporation) is a modified polyethylene homopolymer, the preferable polymer used in the invention. The AC 1702 polyethylene homopolymer has a melting point of about 85 degrees C. to 90 degrees C. (+ or −5 degrees C.), is totally amorphous at room temperature, and is a soft and greaselike material. Further, the AC 1702 polyethylene homopolymer is a low molecular weight greaselike material which has been purposely modified in its polymerization to accommodate compatible additives from a series of components from which an ultimate antifouling formulation is prepared in accordance with this invention. It is postulated that the AC 1702 polyethylene homopolymer utilized in this invention contributes a significant part to the ablation of the ultimate antifouling formulation of the invention.

The waxes which are used in the present formulations are generally characterized as being derivatives of petroleum. They are generally characterized as the following types of hydrocarbons: aromatics, napthenes, olefins, and paraffins. The aromatic hydrocarbons are characterized by the presence of benzene rings, and the naphthenes are saturated hydrocarbons containing one or more ring structures within the hydrocarbon. The olefins are unsaturated openchain hydrocarbons and are characterized by double and triple bonds between carbon atoms. And, the paraffins are saturated, aliphatic (open-chain) hydrocarbons where the carbon atoms are linked together with single bonds. By appropriate techniques, such as, distillation and separation, the petroleum can be separated into these types of hydro-carbons in the form of waxes, oils, solvent, and residues.

The saturated aliphatic waxes may be characterized by their melting points and the processes by which they are derived and separated. For example, waxes derived from the wax-distillate fraction of crude petroleum and commonly referred to as paraffin waxes have molecules with average molecular weights of from about 260 to about 460 and have melting points which are usually between 120 degrees F. and about 140 degrees F. Higher melting point waxes, which are sold as microcrystalline, amorphous and heavy lubricating-oil fractions of the petroleum distillate. The microcrystalline, amorphous and heavy petroleum waxes, are usually derived from the heavy lubricating-oil fractions of the petroleum distillate. The microcrystalline waxes have molecules with average molecular weights of from about 400 to about 700 with from about 40 to 50 carbon atoms and melting points which are normally above 150 degrees F.

As opposed to the low melting point paraffin waxes which tend to be somewhat brittle, microcystalline waxes are tough and resist fracture. Addition of oil to the wax will tend to increase its plasticity. Microcrystalline waxes are generally compatible with other mineral and vegetable waxes are generally compatible with other mineral and vegetable waxes and various resins. Thus, they are especially useful for increasing the hardness and melting point and for decreasing tack, sweating and other undesirable qualities of wax blends. For example, although paraffin waxes have serious shortcomings due to their high crystallinity and to the low intercrystallilne forces bonding one crystal to another, the addition of microcrystalline waxes provides a means of modifying the functional properties of paraffin waxes by controlling the crystal size, the amount of amorphous intercrystalline material, the molecular weight and the transition point of the wax.

| PHYSICAL CHARACTERISTICS OF SOME CHLOROWAXES | | |
|---|---|---|
| Properties | Diamond Shamrock Co. | ICI U.S. Inc. |
| | Chlorowax 70 | Cereclor 70L |
| Color (Gardner) | 2 | 11 |
| Viscosity-Poises 25° C. (Brookfield) | 10000 | 20000 |
| Viscosity-at 210° F. (Saybolt)-in seconds | 400 | — |
| Specific Gravity-25° C./25° C. | 1.55 | 1.55 |
| Chlorine (percent) | 69 | 70 |
| | Chlorowax 40 | |
| Color (Gardner) | 2 | 1 |
| Viscosity-Poises 25° C. (Brookfield) | 31 | 24 |
| Viscosity-at 210° F. (Saybolt)-in seconds | 150 | 126 |
| Specific Gravity-25° C./25° C. | 1.17 | 1.17 |
| Chlorine (percent) | 43 | 42 |
| | Chlorowax 500 | |
| Color (Gardner) | 1 | No Comparable Grade Known |
| Viscosity-Poises 25° C. (Brookfield) | 20 | |
| Viscosity-at 210° F. (Saybolt)-in seconds | 65 | |
| Specific Gravity-25° C./25° C. | 1.35 | |
| Chlorine (percent) | 59 | |
| | Chlorowax 100 | Cereclor S45 |
| Color (Gardner) | 1 | — |
| Viscosity-Poises 25° C. (Brookfield) | 2 | 2 |
| Specific Gravity 25° C./25° C. | 1.13 | 1.17 |
| Chlorine (percent) | 40 | 45 |

Other constituents of the antifouling wax formulation are halogenated aliphatic waxes, such as, chlorowaxes and fluorowaxes or fluorolubes. The halogenated waxes appear to modify the other paraffin and microcrystalline waxes sufficiently so that the resulting matrix has an affinity for immersed application to underwater steel structure surfaces.

This invention uses only the chlorowaxes as they yield better performance under all conditions.

Chlorinated waxes, hereinafter referred to as chlorowaxes, may be described as chlorinated aliphatic saturated hydrocarbons which include molecules having from 10 to 30 carbon atoms. The properties of a particular commercial chlorowax depend on the following factors: (a) the nature of the raw material; (b) the chlorine content; and (c) the conditions of manu-facture, such as the temperature of chlorination. Chlorowaxes are generally produced by passing gaseous chlorine into a paraffinic hydro-carbon at a temperature at which the viscosity of the paraffin is sufficiently low to permit free evolution of hydrogen chloride and solution of the chlorine. Although catalysts are not generally used, some production processes employ a solvent, such as, carbon tetrachloride and hexachloro-butadiene. The chlorine content will normally range from 40% to 70% although chlorowaxes designed for particular purposes have been prepared in which the chlorine contents were less than 40% and, conversely, greater than 70%. Chlorowaxes are insoluble in water and the lower alcohols but readily form emulsions with water in the presence of a suitable emulsifying agent. Chlorowaxes with chlorine contents greater than about 40% are soluble in mineral and lubricating oils, benzene, chlorinated solvents, ether, ketones, and esters. The commercially marketed chlorowaxes are usually designated by a trade name, followed by a number indicating the chlorine content, eg. Chlorowax (trademark of Diamond Shamrock Co.)40, Cereclor (trademark of Imperial Chemical Industries, Ltd.)70

One important added contribution in this invention is the fact that no surfactant is necessary or desired. This observation was made when a pure white mineral oil and petrolatum was used as ingredients in the overall formulation. Surfactants are a specialty chemical, usually made as a customized product, quite expensive, and often times completely unavailable at any price. Such required use therefore in a regularly used formulation is totally intolerable. Thus, the need for a formulation that yields comparable or better results and are made from readily available ingredients and that are cost effective.

The INDRA Micro Waxes, manufactured by Industrial Raw Materials Corp., New York City, N.Y., are highly refined microcrystalline waxes of high melting point and minute needle-like microcrystals. They consist predominately of long branched-chain saturated hydrocarbons wherein their molecular weights range from approximately 580 to 700 with about 41 to 50 carbon atoms. These waxes are insoluble in water; slightly soluble in alcohol; and freely soluble in chloroform, ether, benzene, and many oils. These waxes are extremely tough yet exhibit a high degree of plasticity and have good adhesive properties and water repellancy thus they are good coating materials. The INDRA MIC 30 waxes have a melting point range of from 165 degrees F. to about 175 degrees F. and a penetration (ASTMD5-25) of from 25 to 35.

White mineral oil is used, and the color is extremely important as it insures that a minimum of paraffin oil is present, thus assisting in adhesion. It must also be USP or higher quality. The utilization of a high grade petrolatum also generally assists in offsetting the undesirable effect of the slight decrease in tack (adhesion) that results from the presence of paraffin oil. White mineral oil is manufactured by NuJo/and PENRECO-SONNEBARN Companies. Petrolatum is manufactured by Penreco Co., Butler, Pa.

A wide variety of biocides both inorganic and organic compounds can be added to the mixture and most are effective, to some extent, against marine growth. Inorganic compounds, such as, metal based compounds containing tin, copper, zinc, nickel, cobalt, manganese, and/or mercury are effective and, some more than others, depending upon the overall formulation. Organic compounds having an active structure containing sulfur, chlorine, nitrogen, fluorine, and oxygen atoms are also effective, and again, some more than others depending upon the overall formulation. Some of the most effective biocidal compounds for preventing marine growth on underwater surfaces are copper compounds, such as, cuprons oxide, and the organ-tin compounds, especially in certain formulations.

One biocide, Nopcocide N-96, made by Diamond Shamrock is especially effective, in the present invention. It has an empirical formula $C_8Cl_4N_2$. It has a benzene structure and a molecular weight of 265 and has a chemical name of 2,4,5,6-Tetra-chloro isophthalornitride. It has a melting point of 250 degrees C., a boiling point of about 350 degrees C., and a specific gravity of 1.8.

The Autofast Black 104 in xylene made by Morton Chemical Company, Paterson, N.Y. is found to yield a good contrast color in all underwater applications. It is a homogeneous material and compatible with all ingredients in the formulation. It has good last-fastness properties, i.e., it fades very little during endurance tests conducted at the Industrial Test Laboratory, Naval Shipyard, Pearl Harbor, Honolulu, Hawaii. The final color of the formulation is blue-black and even on a cloudy day in discolored water the color contrast is good. Therefore, ease of application is enhanced.

The steel wool pad used in this invention for simultaneously cleaning and formulation application is preferably about 6-8 inches long and about 1-1½ inches thick, although other sizes can be used. The pad is attached to a stiff waterproof backing which is attached to an applicator handle for ease of application. If no cleaning is necessary, the formulation can be applied by other means, such as, spraying, a squeegee type apparatus where the molten or liquid wax is fed to the squeegee from a pressurized reservoir container, and by a brush applicator.

EXAMPLE 1

One wax formulation capable of underwater application comprises, by weight, from about 3.8% to about 5.8% of an AC1702 polyethylene homopolymer; from about 4.56% to about 6.56% of chlorowax 70L; from about 4.25% to about 6.25% of chlorowax 40; from about 8.55% to about 10.55% of chlorowax 500; from about 5.05% to about 7.05% of chlorowax 100; from about 1.38% to about 3.38% of Indra Mic 30 laminating wax; from about 3.76% to about 5.76% USP white mineral oil; from about 18.09% to about 20.09% Nopcocide N96; from about 40.48% to about 42.48% USP petrolatum; and from about 0.6% to about 1.05% Autofast Black 104 in Xylene. Experimentation shows the formulation used with an impreganated steel wool pad of the formulation cleans and coats the underwater steel structure in one application and upon endurance testing shows in all instances the coating is comparable or better in endurance testing to previously used coatings.

The observation that no surfactant was found to be necessary was corrugated using this formulation. Thus, an advantage of cost and ingredients availability.

EXAMPLE 2

Another wax formulation found to provide a good protective coating, applied as in Example 1 and endurance tested in the same manner, comprises, by weight percent, from about 2.86% to about 4.86% unichlor 40; from about 5.09% to about 7.09% chlorowax 100; from about 6.03% to about 8.03% chlorowax 500; from about 3.09 to about 5.09% Unichlor 70; from about 2.50% to about 4.50% USP white mineral oil; from about 1.26% to about 2.26% Indramic 30; from about 3.33% to about 3.73% AC 1702 polyethylene homopolymer; from about 46.20% to about 48.20% USP Petrolatum; from about 21.11% to about 23.11% Nopcocide N96; and 0.60% to about 1.00% Autofast Black 104 in Xylene. The Unichlor 40 and 70 are equivalent to paraffin waxes to the chlorowax 70L and chlorowax 40 in Example 1. They are manufactured by the Neville Chemical Company, Pittsburgh, PA. Impregnation of the steel wool pad is performed by dipping the pad in the melted wax composition at 135 degrees F. (54.4 degrees C.). In operation and in an immersed state, the pad is pressed against the substrate to be cleaned and coated with a polishing like action, with pressure being exerted at that time.

The advantages of applicants invention include providing a formulation for cleaning and coating underwater steel surfaces simultaneously, a true savings in time, storing, and packing simplicity, as well as, availability of ingredients used a great savings in cash. Drydocking of a ship is unnecessary utilizing this invention.

Obviously, many modifications and variations are possible in light of the above teachings. It is therefore understood that within the scope of the appended claims the invention may be practiced otherwise than as specifically described.

What is claimed is:

1. A wax formulation coating material for application to submerged surfaces consisting of a mixture, by weight percent, of about 3.5% to about 6.0% of a polyethylene homopolymer having a softening point at 85 C. (ASTM E28), a hardness of 90 (ASTM D5), a density of 0.88 g/cc (ASTM D 1505), a viscosity of 40 cps at 140 C. (Brookfield), and an acid number of nil mg./KOH gram; of about 27% to about 31% of a mixture of Chlorowaxes selected from the group consisting of chlorinated waxes with a molecular average of 12 carbon atoms and 70% chlorine content, a molecular average of 24 carbon atoms and 42% chlorine content, a molecular average of 12 carbon atoms and a chlorine content of 60%, a molecular average of 20 carbon atoms and a chlorine content of 40%, and a microcrystalline laminating wax; of about 3.5% to about 6.0% USP white mineral oil; of about 18.0% to about 20.0% 2,4,5,6-tetrachloro isophthalornitride; of about 40.5% to about 42.5% USP petrolatum; and of about 0.6% to about 1.05% Autofast Black 104 in xylene.

2. A wax formulation coating material for application to submerged surfaces as in claim 1 wherein the chlorinated wax with a molecular average of 12 carbon atoms and 70% chlorine content is in an amount of from about 5.0% to about 6.0% is a liquid and having a color of 2 (Gardner), a viscosity of 10,000 poises at 25 C. (Brookfield), a viscosity of 400 seconds at 210 F. (Saybolt), a specific gravity of 1.55 at 25 C.) 25 C., and a chlorine content of 69 in percent.

3. A wax formulation coating material for application to submerged surfaces as in claim 1 wherein the chlorinated wax with a molecular average of 24 carbon atoms and 42% chlorine content is in an amount of from about 4.75% to about 5.75%, has a color of 2 (Gardner), a viscosity of 31 poises at 25 C. (Brookfield), a viscosity of 150 seconds at 210 F. (Saybolt), a specific gravity of 1.17 at 25 C./25 C., and a chlorine content of 43 in percent.

4. A wax formulation coating material for application to submerged surfaces as in claim 1 wherein the chlorinated wax with a molecular average of 12 carbon atoms and a chlorine content of 60% is in an amount of from about 9.0% to about 10.0%, has a color of 1 (Gardner), a viscosity of 20 poises at 25 C. (Brookfield), a viscosity of 65 seconds at 210 F. (Saybolt), a specific gravity of 1.35 at 25 C./25 C., and a chlorine content of 59 in percent.

5. A wax formulation coating material for application to submerged surfaces as in claim 1 wherein the chlorinated wax with a molecular average of 20 carbon atoms and a chlorine content of 40% is in an amount of from about 5.0% to about 7.0%, has a color of 1 (Gardner), a viscosity of 2 poises at 25 C. (Brookfield), a specific gravity of 1.13 at 25 C./25 C., and a chlorine content of 40 in percent.

6. A wax formulation coating material for application to submerged surfaces as in claim 1 wherein the microcrystalline laminating wax is in an amount of 2.0% to about 2.8%, has a color of Lemon NPA (Gardner), a melting point of between about 165–175 F., and a penetration of between about 25 and about 35.

7. A method of coating submerged surfaces for preventing marine growth comprises applying a wax mixture directly to the submerged surfaces, said wax mixture having a formulation substantially as follows:
from about 3.5% to about 6.0% of a polyethylene homopolymer having a softening point at 85 C. (ASTM E28), a hardness of 90 (ASTM D5), a density of 0.88 g/cc. (ASTM D1505), a viscosity of 40 cps at 140 C. (Brookfield), and an acid number of mil mg./koh gram;
from about 27% to about 31% of a mixture of Chlorowaxes selected from the group consisting of chlorinated waxes with a molecular average of 12 carbon atoms and 70% chlorine content, a molecular average of 24 carbon atoms and 42% chlorine content, a molecular average of 12 carbon atoms and a chlorine content of 60%, a molecular average of 20 carbon atoms and a chlorine content of 40% and a microcrystalline laminating wax;
from about 3.5% to about 6.0% USP white mineral oil;
from about 40.5% to about 42.5% USP petrolatum; and from about 0.6% to about 1.05% auto fast black 104 in xylene.

* * * * *